United States Patent Office 3,309,261
Patented Mar. 14, 1967

3,309,261
ADHESION OF URETHANE ADHESIVES TO METALS
Arthur Maurice Schiller, Stamford, George Albert Tanner, Norwalk, and Armand Francis Lewis, Fairfield, Conn., assignors to American Cyanamid Company, Stamford, Conn., a corporation of Maine
No Drawing. Filed Apr. 21, 1966, Ser. No. 544,085
10 Claims. (Cl. 161—190)

This application is a continuation-in-part of our copending application, Ser. No. 296,916, filed July 23, 1963 now abandoned.

This invention relates to a novel metal bonding composition. More particularly, this invention relates to a novel metal adhesive composition comprising a uniform mixture of a polyurethane resin, a diamine curing agent and an aminosilane. Still more particularly, this invention relates to a novel metal to metal bonding adhesive composition which is composed of a polyurethane resin, either polyester based or polyether based, having blended therewith a diamine curing agent and from about 0.25% to about 4.0%, by weight, based on the weight of the polyurethane resin, of an aminosilane, with or without a glycidyl ester or ether.

Previous to our invention, adhesives composed of polyurethane resins, catalysts, curing agents, and other additives useful for metal to metal bonding have been known. Although excellent for many applications, these prior art adhesives have shown many deficiencies the most critical of which is that they do not have the lap shear strength and peel strength necessary to allow their usage in many fields, e.g., in the automotive industry. We have now discovered that these known prior art adhesive compositions can be materially improved by the addition of an aminosilane to the composition. We have found that aminosilanes, when added directly to the urethane adhesive composition, rather than being directly applied to the surface being bonded, materially increase the lap shear strength and the peel strength of the adhesive. In some instances, the increase has been two-fold or even higher. It was indeed surprising that the addition of an aminosilane directly to the resin rather than to the surface being bonded would result in such an unexpected result.

It is therefore an object of the present invention to provide novel adhesive compositions.

It is a further object of the present invention to provide novel metal bonding compositions comprising uniform mixtures of a polyurethane resin, a diamine curing agent and an aminosilane.

These and further objects will become more apparent to those skilled in the art upon reading the more detailed description set forth hereinbelow.

THE POLYURETHANES

Any polyester based or polyether based polyurethane resin may be used in producing the novel adhesives of the present invention. Among the reactive organic polyfunctional polyols employed in preparing one class of polyurethane resins used in the practice of our invention by reaction with a suitable isocyanate compound are the polyalkylene ether, thioether, and ether-thioether glycols represented by the general formula (I) HO—(RX)$_n$—H wherein R represents the same or different alkylene radicals containing up to about 10 carbon atoms, X represents oxygen or sulfur, and $n$ is an integer large enough so that the molecular weight of the polyalkylene ether, thioether, or ether-thioether glycol is at least about 500, e.g., from about 500 to about 10,000. The polyalkylene ether glycols included within this general formula, such as polyethylene glycols, polypropylene glycols, polybutylene glycols, polytetramethylene glycols, polyhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like, are preferred.

Polyalkylenearylene ether, thioether and etherthioether glycols which also have molecular weights ranging from about 500 to about 10,000 but which differ from the above-described polyalkylene glycols in having arylene radicals, such as phenylene, naphthylene and anthrylene radicals, ether unsubstituted or substituted, e.g., with alkyl or aryl groups, and the like, in place of some of the alkylene radicals of said polyalkylene glycols may also be employed as polyol reactants. Polyalkylenearyleneglycols of the type ordinarily used for this purpose will usually contain at least one alkylene ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethane resins useful in the practice of the present invention. While the preparation of polyesters suitable for this purpose has been described in great detail in the prior art, and forms no part of the present invention per se, it may be mentioned here by way of illustration that polyesters of this type may be prepared by the condensation of a polyhydric alcohol, generally a saturated aliphatic diol such as ethylene glycol, propanediol-1,2, propanediol-1,3, butanediol-1,4, pentanediol-1,2, pentanediol-1,5, hexanediol-1,3, hexanediol-1,6, diethylene glycol, dipropylene glycol, triethylene glycol, tetraethylene glycol, and the like, as well as mixtures of such diols with each other and with minor amounts of polyols having more than two hydroxyl groups, preferably saturated aliphatic polyols such as glycerol, trimethylol ethane, trimethylol propane, pentaerythritol, sorbitol, and the like, with a polycarboxylic acid or anhydride, generally a dicarboxylic acid or anhydride which is either saturated or which contains only benzenoid unsaturation, such as oxalic, malonic, succinic, glutaric, adipic, pimelic, suberic, azelaic, sebacic, malic, phthalic, cyclohexanedicarboxylic, and endomethylenetetrahydrophthalic acids, and the like and their isomers, homologs, and other substituted derivatives, e.g., chloroderivatives, or with mixtures of such acids with each other and with unsaturated dicarboxylic acids or anhydrides such as maleic, fumaric, citraconic, and itaconic acids, and the like, as well as with polycarboxylic acids containing three or more carboxyl groups, such as aconitic acid and the like.

The essentially linear polyesters commonly used in preparing polyurethane resins preferably have molecular weights ranging from about 750 to about 3,000. In addition, they will generally have relatively low acid numbers, e.g., acid numbers not appreciably in excess of about 60 and preferably as low as can be practicably obtained, e.g., 2 or less. Correspondingly, they will generally have relatively high hydroxyl numbers, e.g., from about 30 to about 700. When preparing these polyesters, an excess of polyol over polycarboxylic acid is generally used to insure that the resulting essentially linear polyester chains contain a sufficient amount of reactive hydroxyl groups.

Another class of suitable organic polyfunctional polyol reactants includes polyalkylene ether polyols containing more than two reactive hydroxyl groups, such as polyalkylene ether triols, tetrols, and the like, which are prepared, for example, by reacting polyols such as glycerol, trimethylol ethane, trimethylol propane, pentaerythritol, dipentaerythritol, sorbitol, and the like, with lower alkylene oxides such as ethylene oxide, propylene oxide, and the like.

Nitrogen-containing polyfunctional polyols may also be used as polyol reactants. Among such materials there are included the polyesteramides conventionally employed in the preparation of polyurethane resins, i.e., those having molecular weights ranging from about 750 to about 3,000, acid numbers ranging from about 60 as a maximum to as low as can be practicably obtained, e.g., 2 or less, and hydroxyl numbers ranging from about 30 to about 700, and also high molecular weight polyamino alcohols, such as hydroxypropylated alkylene diamines of the general formula (II)      $(HOH_6C_3)_2N-R'-N(C_3H_6OH)_2$ wherein R' represents an alkylene radical having from 2 to 6 carbon atoms, inclusive, of which N,N,N',N'-tetrakis-(2 - hydroxypropyl-ethylenediamine is a representative species, as well as higher analogs thereof, such as hydroxypropylated polyalkylenepolyamines of the general formula

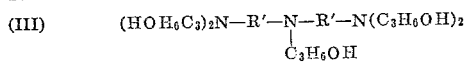

wherein R' is as defined hereinabove (see U.S. Patent No. 2,697,118 to Lundsted et al.).

As can be readily appreciated, mixtures of the various reactive organic polyfunctional polyols described hereinabove may also be employed in preparing polyurethane resins useful in the practice of the present invention.

Just as in the case of the polyol reactant, polyurethane resins may be prepared using a wide variety of organic polyisocyanates, among which there are included aromatic diisocyanates, such as m-phenylenediisocyanate, p-phenylenediisocyanate, 4 - t - butyl-m-phenylenediisocyanate, 4-methoxy-m-phenylenediisocyanate, 4-phenoxy-m-phenylenediisocyanate, 4-chloro-m-phenylenediisocyanate, toluenediisocyanates (either as a mixture of isomers, e.g., the commercially available mixture of 80% 2,4-toluenediisocyanate and 20% 2,6-toluenediisocyanate, or as the individual isomers themselves), m-xylylenediisocyanate, p-xylylenediisocyanate, cumene-2,4-diisocyanate, durenediisocyanate, 1,4 - naphthylenediisocyanate, 1,5-naphthylenediisocyanate, 1,8-naphthylenediisocyanate, 2,6-naphthylenediisocyanate, 1,5 - tetrahydronaphthylenediisocyanate, p,p'-diphenyldiisocyanate, diphenylmethane - 4,4'-diisocyanate, 2,4 - diphenyl-hexane-1,6-diisocyanate, "bitolylenediisocyanate" (3,3' - dimethyl-4,4'-biphenylenediisocyanate), "dianisidinediisocyanate" (3,3'-dimethoxy-4,4'-biphenylenediisocyanate), and polymethylenepolyisocyanates represented by the general formula

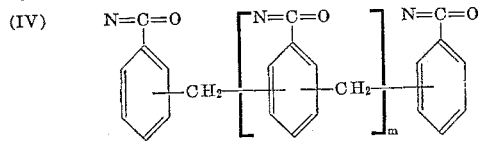

wherein m represents an integer between 0 and about 5, and the like; aliphatic diisocyanates, such as methylenediisocyanate, ethylenediisocyanate, the tri-, tetra-, penta-, hexa-, hepta-, oct-, non- and decamethylene-ω,ω'-diisocyanates, 2 - chlorotrimethylenediisocyanate, 2,3-dimethyl tetramethylenediisocyanate, and the like, and tri- and higher isocyanates, such as benzene-1,3,5-triisocyanate, toluene-2,4,6-triisocyanate, diphenyl-2,4,4'-triisocyanate, triphenylmethane-4,4',4''-triisocyanate, and the like. Mixtures of two or more of such organic polyisocyanates may also be employed to prepare the polyurethane resins by reaction with the ethers and esters described above utilizing procedures well known to those skilled in the art, see for example, U.S. Patents 2,729,618, 3,016,364 and the like.

Examples of these known polyurethane production procedures include the so-called "pre-polymer" technique, as commonly practiced in the production of polyurethane resins, which involves mixing polyol and polyisocyanate under substantially anhydrous conditions, i.e., with usually not more than about 0.2% by weight of water, based on the total weight of the mixture, being present, and with a molar excess of the polyisocyanate over the polyol usually being employed, reacting this mixture at a temperature ranging from about room temperature to about 100° C. for from about 20 minutes to about 8 hours, and then cooling the resulting "pre-polymer" to a temperature of from about room temperature to about 60° C.

Furthermore, particulate or fibrous fillers, such as chopped α-cellulose, asbestos, or glass fibers, and the like, conventional fire-retarding additives, for example, phosphates such as triphenyl phosphate, tricresyl phosphate, tris(2,3-dibromopropyl) phosphate, tris(β-chloroethyl) phosphate, and the like, dyes or pigments, e.g., silica pigments, stabilizers, and the like may be added to the polyurethane resins prior to their use for the production of the novel adhesives of the present invention.

Modifications and changes which may be made in conventional polyurethane reaction mixtures to provide resins having various degrees of flexibility, rigidity and other properties are so well known in the art that no more than a brief mention of some of them need be made here. Thus, in addition to those previously indicated, i.e., using essentially linear polyesters and polyesteramides having certain specified molecular weights, acid numbers and hydroxyl numbers and varying the mol ratio of polyisocyanate to polyol, numerous other modifications, such as using tri- or higher functional monomeric polyols or polycarboxylic acids in preparing the polyol reactant, using tri- or higher functional polyisocyanates, and the like, have been disclosed in the prior art to the accomplishment of these ends. It is contemplated that any or all of these modifications, together with any other manipulative steps described in prior art processes for the preparation of polyurethane resins may be appropriated to the practice of the present invention.

THE CURING AGENTS

For purposes of this invention, it is possible to incorporate any diamine curing agent into the polyurethane resins, including those in prepolymer form, obtained as set forth hereinabove. The diamine curing agents utilized include for example, the alkyl and aryl diamines, such as hexamethylenediamine, 4,4'-diaminophenylmethane, benzidene and its derivatives, p-phenylenediamine, 4,4'-diamino-3,3'-dimethyldiphenylmethane, 4,4'-diamino - 3,3'-dimethoxydiphenylmethane, 3,3'-dichlorodiaminodiphenylmethane and the like. A preferred group of compounds are those designated as the diaminodihalodiaryls of which 4,4'-methylene-bis-2-ortho-chloroaniline is an example. The diamines are incorporated into the urethane polymers or prepolymer syrups in amounts ranging from about 25% to about 200%, preferably about 40% to about 160%, of the stoichiometric equivalent weight of polyurethane, based on its isocyanate group (NCO) content.

THE AMINOSILANES

As mentioned above, we have found that the addition of an aminosilane to the urethane-diamine curing agent adhesive results in the increased lap shear and peel strength of the resin adhesive. The aminosilanes may be added to the urethane resin in amounts ranging from about 0.10% to about 4.0%, by weight, based on the weight of the urethane resin, preferably 0.5% to about 3.0%, by weight, in any manner available. The silane may be added prior to, during or after the addition of the curing agent, however, it should not be added during or after the actual curing of the resin. The amounts mentioned above are critical in that at concentrations less than 0.10%, no material increase in lap shear or peel strengths is recognizable, while at concentrations above about 4.0%, a white deposit tends to form on the surface of the additive upon curing and also the silane tends to interfere with the curing treatment per se.

Any aminosilane may be used to produce the novel adhesive compositions of the present invention. Examples of preferred aminosilanes which may be used herein include gamma-aminopropyltriethoxysilane, delta aminobutyl methyl diethoxysilane, gamma-aminopropyltripropoxysilane, gamma - aminopropylmethyldiethoxysilane, gamma - aminopropylethyldiethoxysilane, gamma-aminopropylphenyldiethoxysilane, delta - aminobutyltriethoxysilane, delta-aminobutylethyldiethoxysilane, delta-aminobutylphenyldiethoxysilane, gamma - aminobutylmethyldiethoxysilane, gamma-aminobutyltriethoxysilane and the like. Other aminosilanes known to those skilled in the art may also be used.

The aminosilanes may be produced by any method known to those skilled in the art. Generally such a procedure comprises reacting a halogenated silicon compound (such as silicon chloroform) which a CN-containing compound (such as acrylonitrile or allyl cyanide) to produce a cyanoalkylsilane. The reaction may be conducted e.g. at 50–250° C., for 0.5 to 10 hours in the presence of a t-silylamine catalyst. The resultant product is then reacted with absolute ethanol (in the case of silanes having an ethoxy group) and the aminosilane is recovered after a catalytic reduction of the CN group to the amine. A procedure for the production of such cyanosilanes is set forth in British Patent No. 923,775. Further procedures for producing said aminosilanes can be found in U.S. Patents Numbers 2,832,754 and 2,930,809.

Our novel compositions are applicable to metal bonding broadly and more specifically to the bonding of metal to metal, metal to glass, metal to wood, metal to plastics and the like with such metals as aluminum, stainless steel, carbon steel, etc. being exemplary.

The use of catalysts in the novel composition of the present invention is not critical, however, we have found that any free-radical generating catalyst may be incorporated into the compositions in order to obtain a faster rate of cure, especially at room temperature, when an ethylenically unsaturated glycidyl additive is added. Catalysts which are exemplary of this class include [2,5-dimethyl-2,5-di(t-butylperoxy)hexane], t-butyl perbenzoate, dicumyl peroxide, benzoyl peroxide, azobisisobutylronitrile, the dialkyl peroxides, e.g. diethyl peroxide, the alkyl hydrogen peroxides, e.g. t-butyl hydrogen peroxide, symmetrical diacyl peroxides, e.g. acetyl peroxide and the like in amounts ranging from about 0.1% to about 3.0%, preferably about 1.0% to about 2.0%, by weight, based on the weight of the ethylenically unsaturated glycidyl additive if it is present.

As mentioned above, various glycidyl ether or ester additives may also be incorporated into our novel bonding compositions in order to further enhance the properties thereof in regard to lap shear and peel strength and also to create a more spreadable or less viscous composition. That is to say, the addition of these glycidyl materials aids in the dilution and the work-ability of the adhesive composition in order to render a more uniform and facile application of the composition. Examples of such glycidyl esters and ethers include diglycidyl esters, diglycidyl ethers, monoethylenically unsaturated monoglycidyl ethers, and monoethylenically unsaturated monoglycidyl esters such as glycidyl methacrylate, glycidyl acrylate, allyl glycidyl ether, diglycidyl phthalate, glycidyl benzoyl acrylamide, the diglycidyl ether of 2,2-bis(p-hydroxyphenyl)propane, and other aryl or alkyl diglycidyl esters and ethers and monoethylenically unsaturated monoglycidyl ethers and esters known to those skilled in the art. We may also use resinous glycidyl esters and ethers, including dimers, trimers, etc. of monomeric epoxy compounds as well as such materials as e.g. epoxidized polyesters, i.e. those resins produced by the epoxidation of unsaturated polyester resins, e.g. those specified above, and epoxidized polyolefins containing extensive unsaturation as are produced by the polymerization of a polyunsaturated olefin such as butadiene or isoprene either alone or in admixture with minor proportions of monoethylenically unsaturated monomers such as butene-1, ethylene, propylene, styrene, vinyl toluene, etc. These polydiolefins are liquid resins and are subjected to epoxidation with, for example, peracetic acid, to partially convert the olefinic unsaturation in the resin to epoxy groups, some of which are internal, e.g., positioned along the resin chain and others of which are terminal, e.g., positioned at the termination of branches formed by the incorporation of a diolefin such as butadiene into the resin chain through one of its double bonds extending away from the resin chain. The epoxidation process generally is not carried to completion, leaving some unsaturation as a site for addition polymerization. The epoxidation process may also provide some hydroxyl functionality in the resultant resin.

These unsaturated epoxy resins are (1) liquid at 23° C., (2) have an iodine number of at least 100 and (3) have an epoxide equivalent weight in the range of from 100–300 (number of grams of resin containing 1 gram mole of epoxide). A particularly useful unsaturated epoxy resin, is a viscous, liquid, partially epoxidized polybutadiene having a viscosity of 1800 poises at 25° C., an epoxide equivalent weight of 177, 2.5%, by weight, of hydroxyl and an iodine number of 185.

We may also use the bisphenol-epichlorohydrin type of epoxy resins herein as well as any other known polymer which falls into the general category of epoxy resins. For example, such resinous epoxy materials as those having the formula;

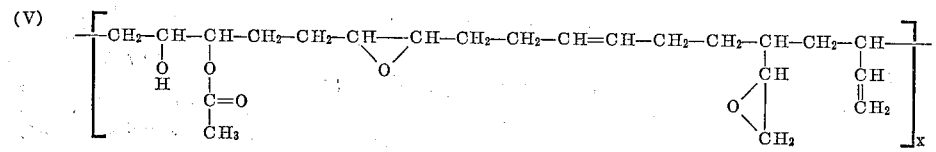

wherein $x$ is at least 2, and those having the formula

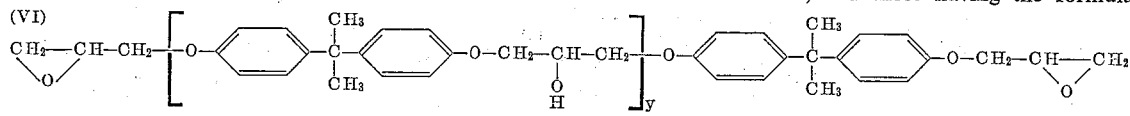

wherein $y$ is at least 1. These polymeric epoxides are well known in the art as are methods for their production. These glycidyl additives may be added, as such, in ratios of from about 1:2 parts to about 1:16 parts of the glycidyl ester or ether to the polyurethane, respectively, with amounts ranging from about 1:4 parts to 1:10 parts being preferred.

The following examples are set forth for purposes of illustration only and are not to be construed as limitations on the present invention except as set forth in the appended claims. All parts and percentages are by weight unless otherwise specified.

Example 1

To a suitable reaction vessel are added 1.5 parts of finely divided 3,3' - methylene-bis-2-orthochloroaniline.

The vessel is heated to about 65° C., cooled to 30° C. and then 20 parts of a polyester based (90/10 ethylene glycol/propylene glycol adipate) commercially available polyurethane resin are added. To this mixture is then added 1%, based on the weight of the polyurethane resin, of gamma-aminopropyltriethoxysilane. Two aluminum plates, two stainless steel plates and two carbon steel plates, each measuring 6" x 11", are treated with chromic acid in order to achieve a clean surface. The polyurethane adhesive is then spread evenly on one plate of each pair and then on the other plate and the two are set on top of each other. Each sandwich is then placed in an electrically heated hydraulic press at a temperature of 105° C. The sandwiches are kept under a pressure of about 170 p.s.i. at the 105° temperature for about 1 hour. The temperature is then raised to 158° C. and held for an additional hour. The sandwiches are removed from the press and placed in an oven at 80° C. for about 15 hours. The resultant sandwiches show the following results (Table I) when subjected to tests designed to indicated peel strength and lap shear strength values.

Example 2

Following the procedure of Example 1, except that an equivalent amount of a polyether based (polytetramethylene-oxide type) commercially available polyurethane resin and 2% of the silane are used, two metal plates and two carbon steel plates (6" x 11") are bonded and subjected to tests for peel strength. The results are given below in Table I.

Following the procedures of Examples 1 and 2 various silanes are added to various commercially available polyurethane resins in ratios varying from 0.5% to 6.0 and the resultant peel strengths of materials bonded with these adhesives are given below in Table I.

TABLE I

| Ex. | Urethane of Ex. | Percent Silane | | | Curing Agent | Glycidyl Additive | Ratio of Urethane to Glycidyl Additive | Mode of Application | Peel Strength at 23° C., lb./in. | | |
|---|---|---|---|---|---|---|---|---|---|---|---|
| | | APTS | ABMS | GPTS | | | | | Al | SS | CS |
| 1 | 1 | 1 | | | MOCA | | | Internal [2] | 100 | 90 | 67 |
| 2 | 2 | 2 | | | MOCA | | | do | 87 | | 82 |
| 3 | 1 | 1 | | | MOCA | | | do | 57 | 35 | 45 |
| 4 | 1 | 1 | | | MOCA [1] | GMA | 9/1 | do | | 40 | 51 |
| 5 | 1 | | 2 | | MOCA | AGE | 9/1 | do | | 72 | 62 |
| 6 | 1 | | 0.5 | | MOCA | | | do | | | 80 |
| 7 | 2 | | 1.5 | | PDA | | | do | | | 56 |
| 8 | 1 | 1 | | | MOCA [1] | GMA | 9/1 | do | | 65 | |
| 9 | 1 | | | 1 | MOCA | | | do | | | 45 |
| 10 | 1 | | | 1.5 | MOCA | | | do | | 36 | |
| 11 | 1 | | | 1 | MOCA | GMA | 9/1 | do | | 42 | 51 |
| 12 | 2 | | | 2 | MOCA [1] | DGEP | 9/1 | do | | 39 | 51 |
| 13 | 1 | 1 | | | MOCA | GMA | 9/1 | Surface [3] | | 50 | 57 |
| 14 | 1 | 2 | | | MOCA | GMA | 9/1 | do | | 46 | 61 |
| 15 | 1 | 6 | | | MOCA | GMA | 9/1 | do | | 52 | 67 |
| 16 | 1 | | | 1 | MOCA | | | do | | | 40 |
| 17 | 2 | | | 1.5 | MOCA | | | do | | 35 | |
| 18 | 1 | | | | MOCA [1] | A | 9/1 | Internal [2] | | 63 | |
| 19 | 1 | 1 | | | MOCA [1] | B | 9/1 | do | | 71 | 60 |
| 20 | 1 | | 2 | 1 | MOCA | C | 9/1 | do | | 65 | |
| 21 | 2 | D-1% | | | MOCA [1] | GMA | 9/1 | do | | 64 | |

[1] 0.05 part of 2,5-dimethyl-2,5-di(t-butyl peroxy)hexane added.
[2] Silane used as component of adhesive mixture.
[3] Silane applied to inner surface of metal before applying adhesive.
A—A commercially available liquid, partially epoxidized polybutadiene having a viscosity of 1,800 poises at 25° C., an epoxide equivalent of 177 and an iodine number of 185.
B—A commercially available resinous epoxide having a structure similar to Formula V, above, having a viscosity of 1,900 poises at 23° C. and an epoxide equivalent of 9%.
C—A commercially available epichlorohydrin-Bisphenol resin having a structure similar to Formula VI, above, wherein y is 2, having a softening point of 69° C. and an epoxide equivalent of 500.
D—Gamma-aminopropylphenyldiethoxy silane used instead of APTS.
MOCA—4,4'-methylene-bis-2-orthochloroaniline.
PDA—p-Phenylenediamine.
GMA—Glycidyl methacrylate.
AGE—Allyl glycidyl ether.
DGEP—The diglycidyl ether of 2,2-bis-(p-hydroxyphenyl)propane.
Al—Aluminum.
SS—Stainless steel.
CS—Carbon steel.
APTS—Gamma-aminopropyltriethoxy silane.
ABMS—Delta-aminobutylmethydiethoxy silane.
GPTS—Gamma-glycidoxypropyltrimethoxy silane (comparative).

What is claimed is:

1. A novel metal bonding adhesive composition comprising a uniform mixture of
   (a) a polyurethane resin,
   (b) about 25% to about 200% of the stoichiometric equivalent of the NCO content of (a), of a diamine curing agent and,
   (c) from about 0.10% to about 4.0%, by weight, based on the weight of (a), of an aminoalkyllower-alkoxysilane wherein the alkyl group contains from 3 to 4 carbon atoms, inclusive.

2. A novel metal bonding adhesive composition comprising a uniform mixture of
   (a) a polyurethane resin,
   (b) about 25% to about 200% of the stoichiometric equivalent of the NCO content of (a), of a diamine curing agent,
   (c) from about 0.25% to about 4.0%, by weight, based on the weight of (a), of an aminoalkyllower-alkoxysilane wherein the alkyl group contains from 3 to 4 carbon atoms, inclusive, and
   (d) a glycidyl ether or ester, the ratio of (d) to (a) ranging from about 1:2 to about 1:16, respectively.

3. An adhesive composition according to claim 1 wherein (b) is 4,4'-methylene-bis-2-orthochloroaniline.

4. An adhesive composition according to claim 1 wherein said aminoalkyloweralkoxysilane is gamma-aminopropyltriethoxysilane.

5. An adhesive composition according to claim 1 wherein said aminoalkyloweralkoxysilane is delta-aminobutylmethyldiethoxysilane.

6. A unitary structure composed of at least two metal layers, said layers being bonded with the adhesive composition of claim 1.

7. A unitary structure composed of at least two metal layers, said layers being bonded with the adhesive composition of claim 2.

8. A unitary structure composed of at least two metal layers, said layers being bonded with the adhesive composition of claim 3.

9. A unitary structure composed of at least two metal layers, said layers being bonded with the adhesive composition of claim 4.

10. A unitary structure composed of at least two metal layers, said layers being bonded with the adhesive composition of claim 5.

References Cited by the Examiner

UNITED STATES PATENTS 2,832,754   4/1958   Jex et al. _____ 260—46.5
3,200,031   8/1965   Rittenhouse _____ 260—824

OTHER REFERENCES

Bodnar et al.: "Adhesives Age," vol. 2, No. 4 (April 1959), pp. 29–33.

Heiss et al.: "Industrial and Engineering Chemistry," vol. 46 (1954), pp. 1498–1503.

SAMUEL H. BLECH, *Primary Examiner.*